US009052823B2

(12) United States Patent
Yamamoto et al.

(10) Patent No.: US 9,052,823 B2
(45) Date of Patent: Jun. 9, 2015

(54) STORAGE SYSTEM AND DATA MANAGEMENT METHOD WITH APPLICATION SPECIFIC STORAGE TIERS

(75) Inventors: Masayuki Yamamoto, Sagamihara (JP); Yoshiaki Eguchi, Yokohama (JP); Azusa Sudo, Yokohama (JP)

(73) Assignee: HITACHI, LTD., Tokyo (JP)

( * ) Notice: Subject to any disclaimer, the term of this patent is extended or adjusted under 35 U.S.C. 154(b) by 186 days.

(21) Appl. No.: 12/988,653

(22) PCT Filed: May 18, 2010

(86) PCT No.: PCT/JP2010/003335
§ 371 (c)(1),
(2), (4) Date: Oct. 20, 2010

(87) PCT Pub. No.: WO2011/145138
PCT Pub. Date: Nov. 24, 2011

(65) Prior Publication Data
US 2011/0289287 A1     Nov. 24, 2011

(51) Int. Cl.
G06F 12/00    (2006.01)
G06F 3/06     (2006.01)

(52) U.S. Cl.
CPC ............ *G06F 3/0605* (2013.01); *G06F 3/0649* (2013.01); *G06F 3/0665* (2013.01); *G06F 3/0685* (2013.01)

(58) Field of Classification Search
CPC ...... G06F 3/0689; G06F 12/08; G06F 12/023
USPC ............................................ 711/5, 117, 170
See application file for complete search history.

(56) References Cited

U.S. PATENT DOCUMENTS

| 2005/0055603 A1 | 3/2005 | Soran et al. |
| 2006/0005206 A1* | 1/2006 | Schneider ..................... 719/319 |
| 2008/0104350 A1 | 5/2008 | Shimizu et al. |

(Continued)

FOREIGN PATENT DOCUMENTS

| JP | 2008-112276 A | 5/2008 |
| JP | 2009-116436 A | 5/2009 |

(Continued)

OTHER PUBLICATIONS

European Search Report received in European Application No. 10851703 dated Jan. 9, 2014.

*Primary Examiner* — Gurtej Bansal
(74) *Attorney, Agent, or Firm* — Mattingly & Malur, PC

(57) ABSTRACT

Proposes the realization of the performance stability operation of virtual volumes and the stabilized access performance for the virtual volumes in the storage apparatus. In the storage apparatus which configures a pool of multiple types of storage tiers of different performances, provides virtual volumes to the host computer and, in accordance with a write request from an application to a virtual volume, assigns pages to the relevant virtual volume from the pool, a policy associating an application with the virtual volume with which the relevant application reads/writes data, a storage tier to assign pages to the relevant virtual volume, and the priority of the relevant storage tier is managed and, in accordance with a write request from the application, complying with the corresponding policy, among the storage tiers associated with the corresponding virtual volume, pages are assigned from the storage tier of the higher priority to the relevant virtual volume.

14 Claims, 20 Drawing Sheets

(56) References Cited

U.S. PATENT DOCUMENTS

| | | |
|---|---|---|
| 2008/0126738 A1* | 5/2008 | Hepkin et al. ............... 711/171 |
| 2009/0119529 A1 | 5/2009 | Kono et al. |
| 2009/0198748 A1* | 8/2009 | Ash et al. ..................... 707/204 |
| 2010/0023685 A1 | 1/2010 | Ikejiri et al. |
| 2010/0077168 A1 | 3/2010 | Arakawa |
| 2011/0072225 A1 | 3/2011 | Kawaguchi et al. |
| 2011/0197046 A1* | 8/2011 | Chiu et al. .................... 711/171 |

FOREIGN PATENT DOCUMENTS

| | | |
|---|---|---|
| JP | 2010-33261 A | 2/2010 |
| JP | 2010-102464 A | 5/2010 |

* cited by examiner

FIG.6

| APPARATUS ID | APPARATUS TYPE | APPARATUS INFORMATION | IP ADDRESS |
|---|---|---|---|
| ST1 | STORAGE APPARATUS | VENDOR A, MODEL A1, SERIAL NUMBER 10 | 10.10.10.10 |
| H1 | HOST COMPUTER | VENDOR B, MODEL B1, SERIAL NUMBER 20 | 10.10.10.11 |
| H2 | HOST COMPUTER | VENDOR B, MODEL B1, SERIAL NUMBER 21 | 10.10.10.12 |
| H3 | HOST COMPUTER | VENDOR B, MODEL B1, SERIAL NUMBER 22 | 10.10.10.13 |
| ⋮ | ⋮ | ⋮ | ⋮ |

| POLICY ID | SERVER ID | APPLICATION ID | VIRTUAL VOL LIST | STORAGE TIER ALLOCATION ORDER | |
|---|---|---|---|---|---|
| Policy1 | H1 | AP1 | v101, v102 | Tier0, Tier1, Tier2 | |
| Policy2 | H2 | AP2 | v103, v104 | Tier0, Tier1 | |
| Policy3 | H3 | AP3 | v105 | Tier1, Tier2 | 28 |
| 28A | 28B | 28C | 28D | 28E | |

FIG.8

| MAPPING ID | APPLICATION ID | DATA ID | VIRTUAL VOL | CORRESPONDING PAGE |
|---|---|---|---|---|
| Map 01 | AP 1 | DATA1A | VOL 1 | p01, p02 |
| ⋮ | ⋮ | ⋮ | ⋮ | ⋮ |
| 29A | 29B | 29C | 29D | 29E |

| VIRTUAL VOL ID | HOST ASSIGNMENT STATUS | VIRTUAL CAPACITY | THRESHOLD | ASSIGNED CAPACITY |
|---|---|---|---|---|
| v101 | Allocated (PID=2, LUN=1) | 10GB | 6GB | 6GB |
| v102 | Allocated (PID=2, LUN=2) | 10GB | 6GB | 2GB |
| v103 | Allocated (PID=3, LUN=1) | 10GB | 6GB | 2GB |
| v104 | Allocated (PID=3, LUN=2) | 10GB | 6GB | 2GB |
| v105 | Allocated (PID=3, LUN=3) | 10GB | 6GB | 2GB |
| ⋮ | ⋮ | ⋮ | ⋮ | ⋮ |
| 36A | 36B | 36C | 36D | 36E |

| VIRTUAL VOL ID | POOL ID | ASSIGNED LBA | ASSIGNED PAGE | I/O FREQUENCY |
|---|---|---|---|---|
| v101 | Pool1 | [0GB] – [2GB] | p01 | 100 |
| | | [2GB] – [4GB] | p02 | 200 |
| | | [4GB] – [6GB] | p03 | 80 |
| v102 | Pool1 | [2GB] – [4GB] | p04 | 40 |
| v103 | Pool1 | [0GB] – [2GB] | p05 | 90 |
| v104 | Pool1 | [4GB] – [6GB] | p06 | 30 |
| v105 | Pool1 | [0GB] – [2GB] | p07 | 20 |
| ⋮ | ⋮ | ⋮ | ⋮ | ⋮ |
| 37A | 37B | 37C | 37D | 37E |

| POOL ID | PAGE ID | POOL VOL | LBA | VIRTUAL VOL ASSIGNMENT STATUS |
|---|---|---|---|---|
| pool1 | p01 | (v201, 10GB) | [0GB] – [2GB] | Allocated (v101) |
| | p02 | | [2GB] – [4GB] | Allocated (v101) |
| | p03 | | [4GB] – [6GB] | Allocated (v101) |
| | p04 | | [6GB] – [8GB] | Allocated (v102) |
| | p05 | | [8GB] – [10GB] | Allocated (v103) |
| | p06 | (v202, 10GB) | [0GB] – [2GB] | Allocated (v104) |
| | p07 | | [2GB] – [4GB] | Allocated (v105) |
| | p08 | | [4GB] – [6GB] | Unallocated |
| | p09 | | [6GB] – [8GB] | Unallocated |
| | p10 | | [8GB] – [10GB] | Unallocated |
| | p11 | (v203, 10GB) | [0GB] – [2GB] | Unallocated |
| | p12 | | [2GB] – [4GB] | Unallocated |
| | p13 | | [4GB] – [6GB] | Unallocated |
| | p14 | | [6GB] – [8GB] | Unallocated |
| | p15 | | [8GB] – [10GB] | Unallocated |
| | p16 | (v204, 10GB) | [0GB] – [2GB] | Unallocated |
| | …… | | …… | …… |
| | p21 | (v205, 10GB) | [0GB] – [2GB] | Unallocated |
| | …… | | …… | …… |
| | p25 | (v206, 10GB) | [0GB] – [2GB] | Unallocated |
| | …… | | …… | …… |
| ⋮ | ⋮ | ⋮ | ⋮ | ⋮ |
| 38A | 38B | 38C | 38D | 38E |

| Tier ID | PG ID | CORRESPONDING STORAGE DEVICE | MEDIA TYPE | POOL VOL ID |
|---------|-------|------------------------------|------------|-------------|
| Tier0   | PG01  | a0,a1,a2,a3                  | SSD        | v201        |
| Tier1   | PG02  | b0,b1,b2,b3                  | FC         | v202        |
|         | PG03  | c0,c1,c2,c3                  | FC         | v204        |
| Tier2   | PG04  | d0,d1,d2,d3                  | SATA       | v203        |
|         | PG05  | e0,e1,e2,e3                  | SATA       | v205        |
|         | PG06  | f0,f1,f2,f3                  | SATA       | v206        |
| ⋮       | ⋮     | ⋮                            | ⋮          | ⋮           |
| 39A     | 39B   | 39C                          | 39D        | 39E         |

39

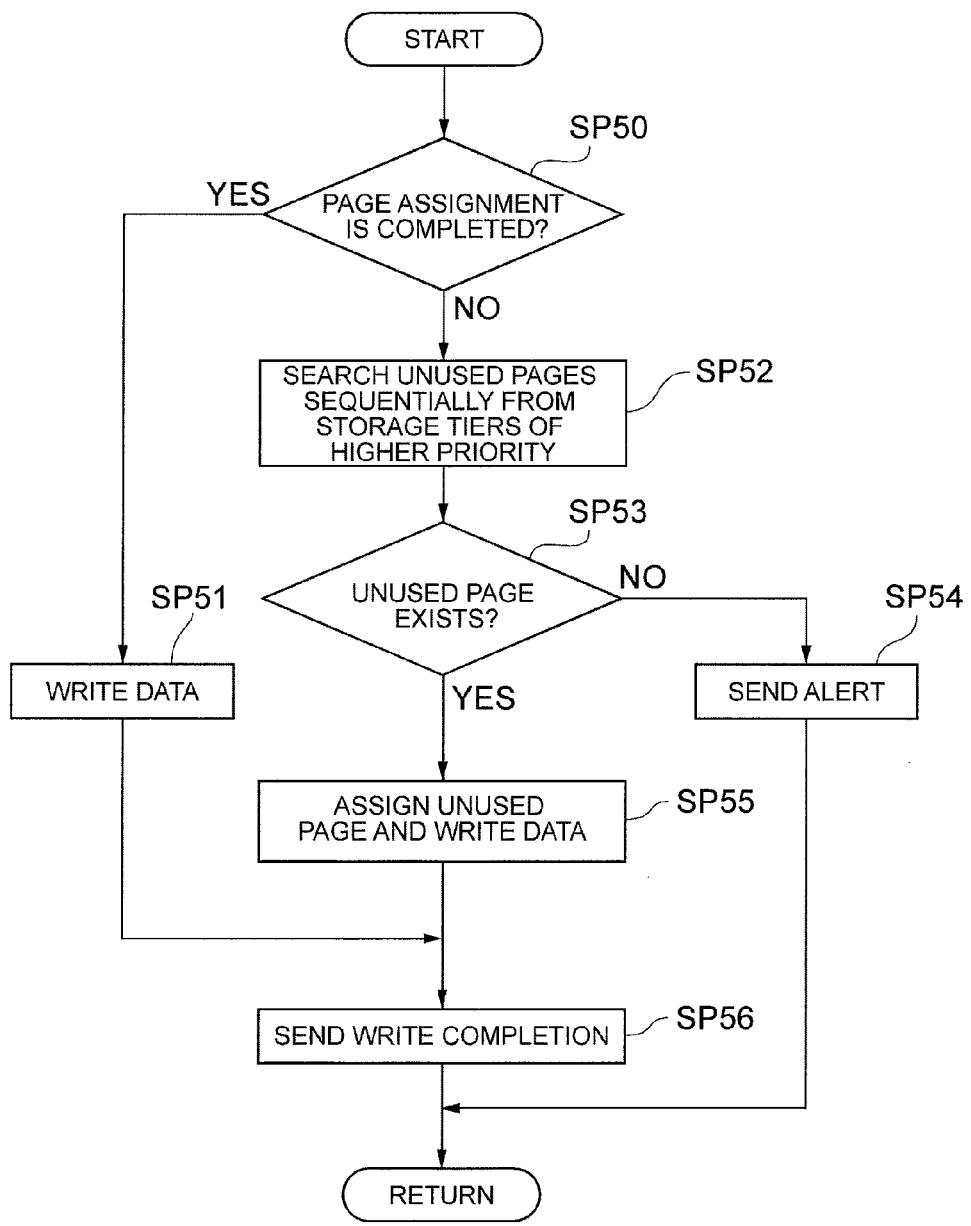

STORAGE SYSTEM AND DATA MANAGEMENT METHOD WITH APPLICATION SPECIFIC STORAGE TIERS

TECHNICAL FIELD

This invention relates to a storage apparatus and a data management method, and can be suitably applied, for example, to a storage apparatus equipped with a tiered data management function.

BACKGROUND ART

Conventionally, as a data management method in a storage apparatus, a tiered data management method has been proposed (e.g. PTL 1).

By this tiered data management method, respective storage areas respectively provided by multiple types of storage devices of different performances are managed as respectively different types of storage tiers, and the different storage tiers configure a pool, while a virtual volume is provided to the host computer and, in accordance with a write request to the virtual volume from the host computer, a storage area is dynamically assigned to the relevant virtual volume from the pool, and the write target data is stored in the assigned storage area.

Furthermore, by this tiered data management method thereafter the access frequencies from the host computer for respective data written to the virtual volume are managed, and the data of the high access frequency is migrated to the storage area provided by a high-speed and high-performance storage tier (storage tier composed of storage areas of high-speed and high-performance storage devices) while the data of the low access frequency is migrated to the storage area provided by a low-speed and low-performance storage tier (storage tier composed of storage areas of low-speed and low-performance storage devices).

CITATION LIST

Patent Literature

[PTL 1]
Specification of US Patent Application Publication No. 2005/055603

SUMMARY OF INVENTION

Technical Problem

However, by the conventional tiered data management method disclosed in PTL 1, the importance of an application which is installed in the host computer and actually reads/writes data from/to the virtual volume is not taken into any consideration and the storage tier to assign the storage area in the area to which the data is written in the virtual volume is determined only in accordance with the access frequency for the data from the host computer (application).

Therefore, by the conventional tiered data management method, as the storage area is assigned to the data of the application of low importance from a high-speed and high-performance storage tier (hereinafter referred to as the "high-performance storage tier"), as a result, there are cases where the storage area of the high-performance storage tier runs out and the storage area cannot be assigned to the data of the application of high importance from a high-performance storage tier.

Furthermore, by the conventional tiered data management method, though the assignment of the storage area from the storage tier to the virtual volume is performed in units of a specified size (hereinafter referred to as the "page"), if the data in the same file is stored across multiple pages, it is possible that the pages may be assigned from different storage tiers. This case may lead to uneven access performances for respective data parts in the same file and cause a problem in that a stable access for this type of data cannot be performed.

This invention was devised in view of the above-mentioned points, and its object is to propose a storage apparatus and a data management method by which the performance stability operation of virtual volumes can be realized.

Solution to Problem

In order to solve the above-mentioned problems, this invention provides a storage apparatus comprising a plurality of types of storage devices with different performances, and a controller for managing respective storage areas respectively provided by the plurality of types of storage devices as respectively different types of storage tiers, configuring a pool from the plurality of different types of storage tiers, providing a virtual volume to a host computer, assigning a storage area to the relevant virtual volume from the pool in page units of a specified size in accordance with a write request to the virtual volume from an application installed in the host computer, and storing write target data in the assigned page, wherein the controller manages a policy associating the application, the virtual volume with which the relevant application reads/writes data, the storage tier to assign the page to the relevant virtual volume, and the priority of the relevant storage tier, and, in accordance with a write request from the corresponding application to the virtual volume, assigns the page from the storage tier of the higher priority to the relevant virtual volume among the storage tiers associated with the relevant virtual volume in accordance with the corresponding policy.

The present invention additionally provides a data management method in a storage apparatus comprising a plurality of types of storage devices with different performances, and a controller for managing respective storage areas respectively provided by the plurality of types of storage devices as respectively different types of storage tiers, configuring a pool from the plurality of different types of storage tiers, providing a virtual volume to a host computer, assigning a storage area to the relevant virtual volume from the pool in page units of a specified size in accordance with a write request to the virtual volume from an application installed in the host computer, and storing write target data in the assigned page, wherein the controller comprises a first step of managing a policy associating the application, the virtual volume with which the relevant application reads/writes data, the storage tier to assign the page to the relevant virtual volume, and the priority of the relevant storage tier, and a second step of assigning, in accordance with a write request from the corresponding application to the virtual volume, the page from the storage tier of the higher priority to the relevant virtual volume among the storage tiers associated with the relevant virtual volume in accordance with the corresponding policy.

Advantageous Effects of Invention

According to this invention, for each application, the storage tier to which pages are assigned when the application writes data to a virtual volume can be limited in advance, and therefore, for example, by associating a high-performance storage tier with an application of high importance, it can be ensured that pages are always assigned from the high-performance storage tier if the relevant application writes data to the virtual volume. By this method, performance stability operation of virtual volumes can be realized.

BRIEF DESCRIPTION OF DRAWINGS

FIG. 6 is a conceptual diagram explaining an apparatus table.

FIG. 7 is a conceptual diagram explaining a virtual volume page assignment policy management table.

FIG. 8 is a conceptual diagram explaining a data/page mapping management table.

FIG. 9 is a conceptual diagram explaining a virtual volume management table.

FIG. 10 is a conceptual diagram explaining a virtual volume page assignment management table.

FIG. 11 is a conceptual diagram explaining a virtual volume pool management table.

FIG. 12 is a conceptual diagram explaining a storage tier management table.

FIG. 20 is a flowchart showing the procedure of the write processing.

DESCRIPTION OF EMBODIMENT

An embodiment of this invention is now described in detail with reference to the drawings.

(1) Configuration of Computer System in This Embodiment

Figure 1:
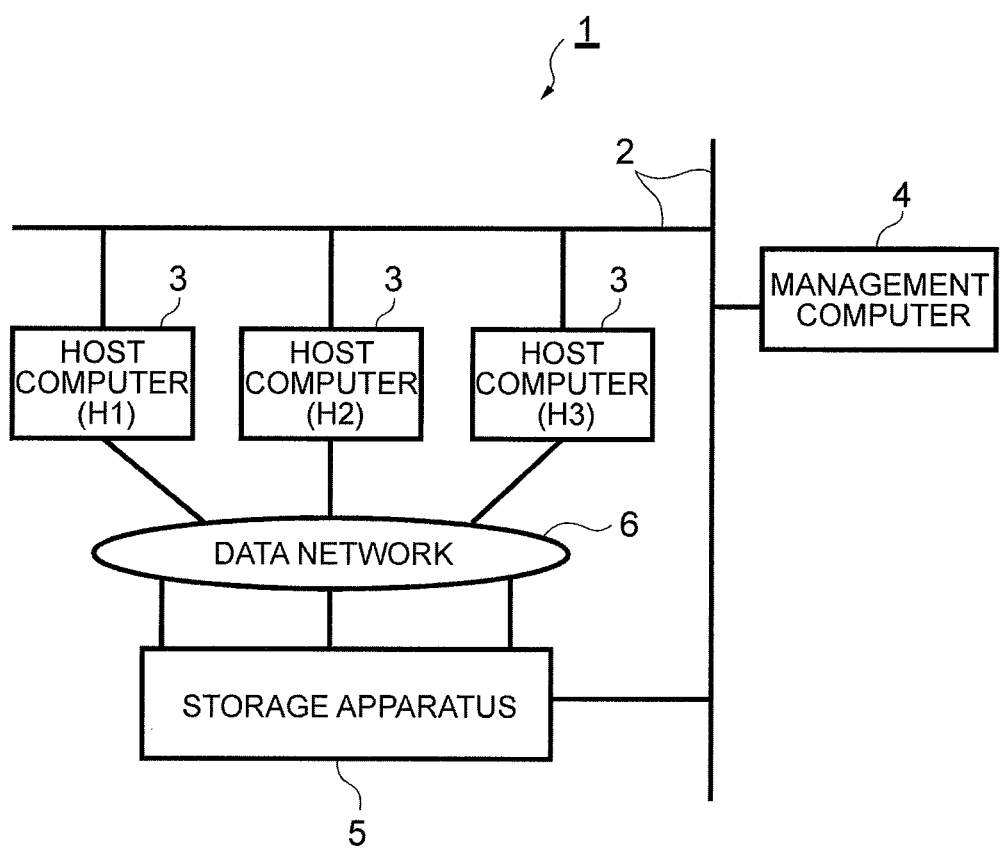
FIG. 1 is a block diagram showing the entire configuration of a computer system by this embodiment.

In FIG. 1, 1 indicates a computer system by this embodiment as a whole. This computer system 1 comprises multiple host computers 3 mutually connected via a management network 2, a management computer 4, and a storage apparatus 5, and is configured by the connection of the respective host computers 3 and the storage apparatus 5 via a data network 6 such as SAN (Storage Area Network) or others.

Figure 2:
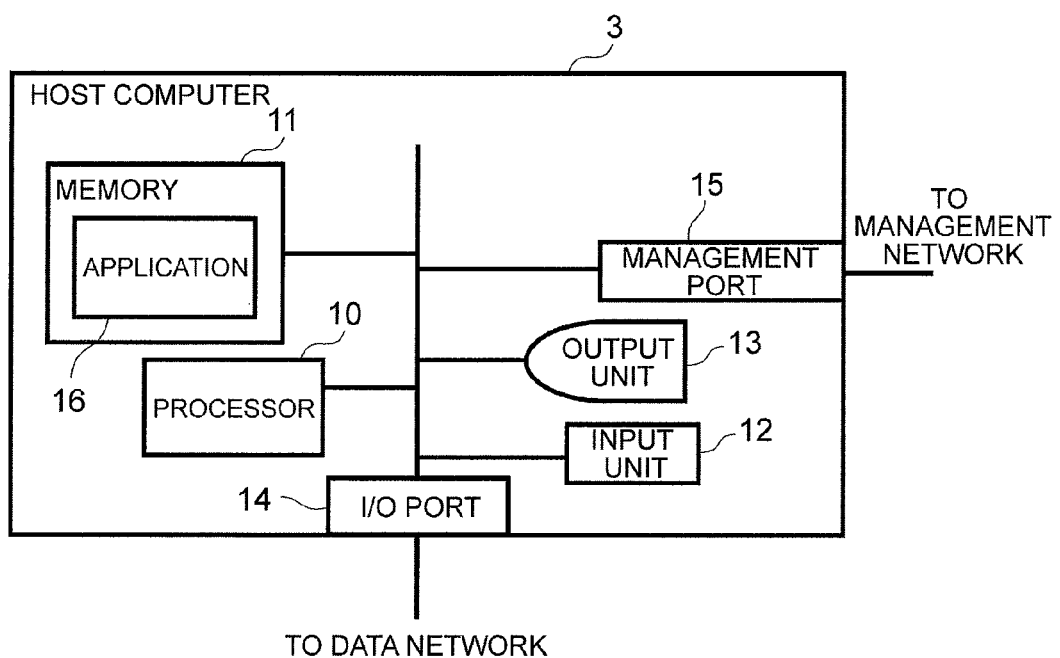
FIG. 2 is a block diagram showing the skeleton framework of a host computer.

The host computer 3 is, as shown in FIG. 2, a computer device comprising information processing resources such as a processor 10 and a memory 11, and is configured of, for example, a personal computer, a work station, a mainframe, or others. The host computer 3 comprises an input unit 12 such as a keyboard, a switch, a pointing device and/or a microphone, and an output unit 13 such as a monitor display and/or a speaker, is connected to the data network 6 via an I/O port 14, and is connected to the management network 2 via a management port 15. In the memory 11 of the host computer 3, respective applications 16 are stored.

Figure 3:
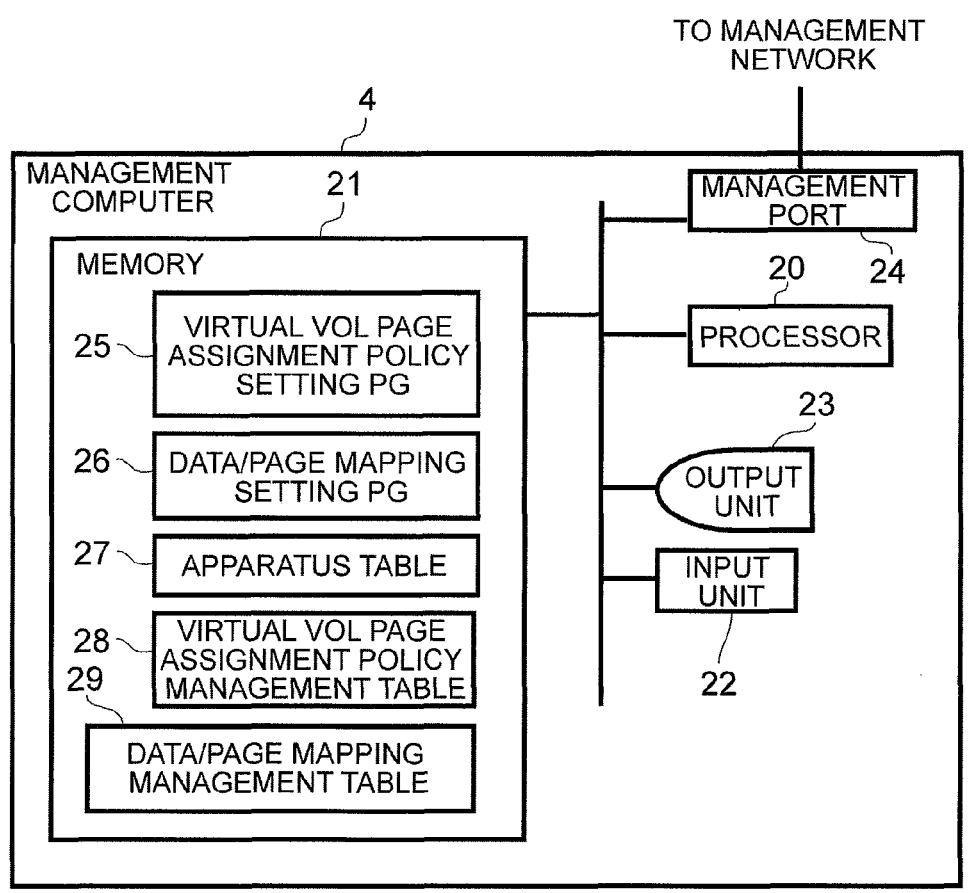
FIG. 3 is a block diagram showing the skeleton framework of a management computer.

The management computer 4 is, as shown in FIG. 3, a computer device comprising information processing resources such as a processor 20 and a memory 21, and is configured of, for example, a personal computer, a work station, a mainframe, or others. The management computer 4, as the host computer 3, comprises an input unit 22 such as a keyboard, a switch, a pointing device and/or a microphone, and an output unit 23 such as a monitor display and/or a speaker, and is connected to the management network 2 via a management port 24. In the memory 21 of the management computer 4, a virtual volume page assignment policy setting program 25, a data/page mapping setting program 26, an apparatus table 27, a virtual volume page assignment policy management table 28, and a data/page mapping management table 29, which are described later, are stored.

Figure 4:
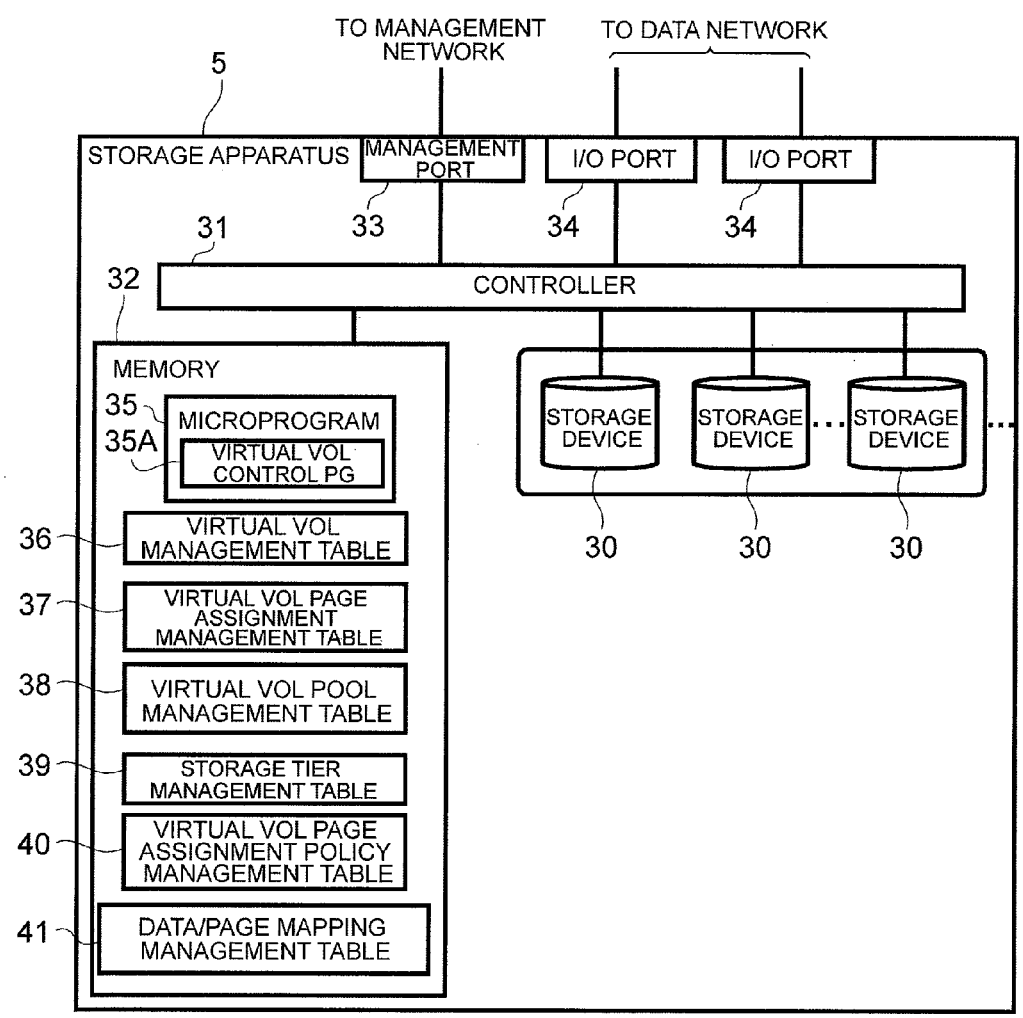
FIG. 4 is a block diagram showing the skeleton framework of a storage apparatus.

The storage apparatus 5 is, as shown in FIG. 4, configured of information processing resources such as one or more storage devices 30, a controller 31, and a memory 32, and is connected to the management network 2 via a management port 33 as well as connected to the data network 6 via an I/O port 34.

The storage device 30 is, for example, configured of a semiconductor memory such as SSD (Solid State Drive), a high-cost, high-performance disk device such as an FC (Fibre Chanel) disk and an SAS (Serial Attached SCSI) disk, and a low-cost, low-performance disk device such as an SATA (Serial AT Attachment) disk.

The controller 31 is a processor which controls the operation of the entire storage apparatus 5. By the controller 31 executing the microprogram 35 stored in the memory 32, the respective types of processing are performed in the entire storage apparatus 5.

The memory 32 is used for maintaining the microprogram 35 and the control information read from the storage device 30 when starting up the storage apparatus 5 as well as used as the work memory of the controller 31 and as the memory for temporarily storing the data read and written from and to the storage device 30. A virtual volume management table 36, a virtual volume page assignment management table 37, a virtual volume pool management table 38, a storage tier management table 39, a virtual volume page assignment policy management table 40, and a data/page mapping management table 41, which are described later, are also stored in this memory 32 and maintained.

Figure 5:
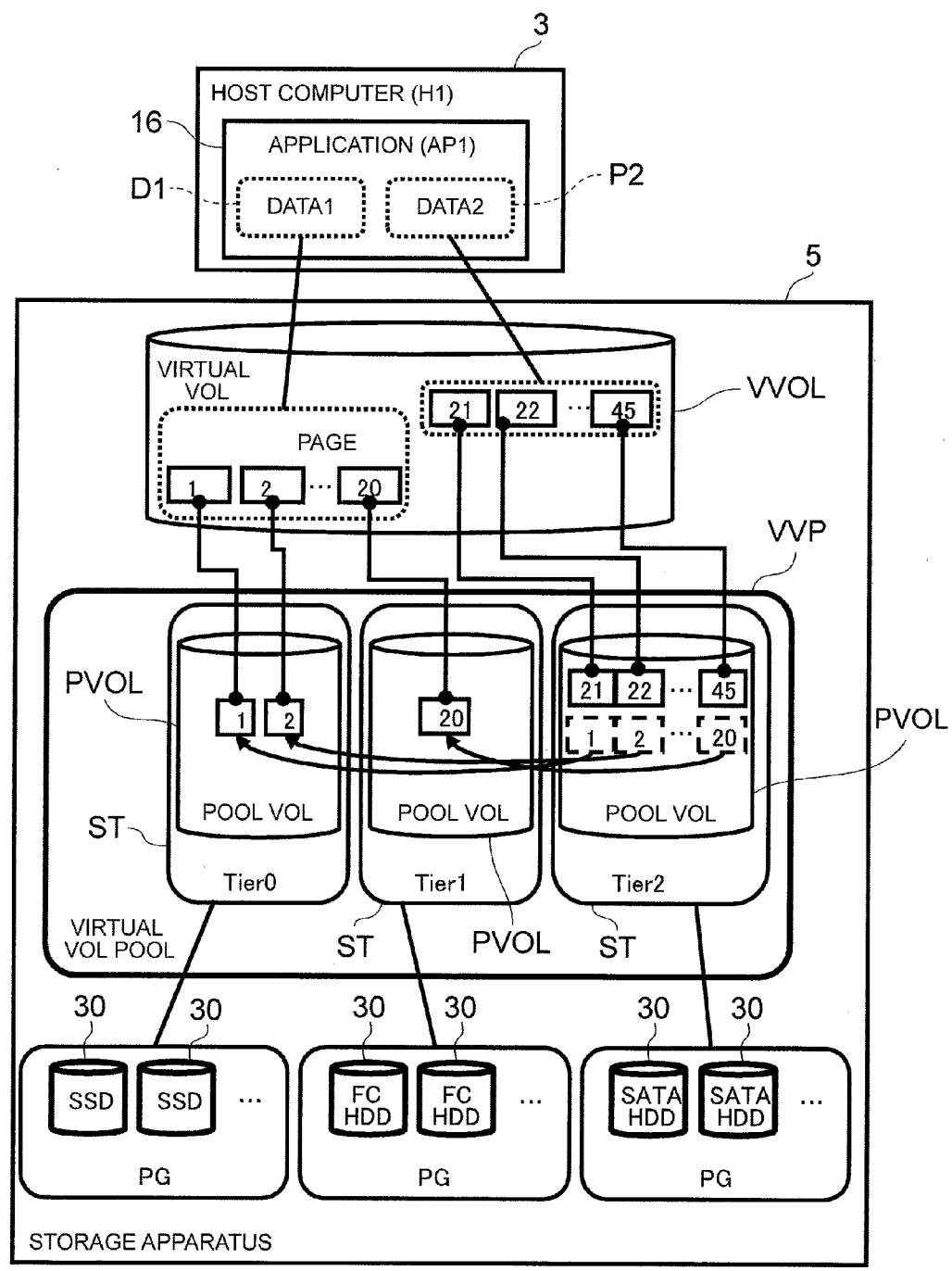
FIG. 5 is a conceptual diagram showing the logical configuration of the storage apparatus.

FIG. 5 shows the logical configuration of the storage apparatus 5. In this storage apparatus 5, a parity group PG is defined by one or more storage devices 30 of the same type (SSD, FC, SATA or others) and, in a storage area provided by one or more storage devices 30 configuring the one parity group PG, one or more pool volumes PVOLs are defined. Furthermore, one storage tier ST is defined by one or more pool volumes PVOLs defined in the parity group PG of the same type, and one virtual volume pool VVP is defined by different types of multiple storage tiers STs (different types of multiple storage tiers STs of storage devices 30 providing the storage area).

In this case, among the SSDs, the FC hard disk drives, and the SATA hard disk drives, the SSDs are the highest in reliability and in response performance, and the SATA hard disk devices are the lowest in reliability and in response performance. Therefore, it can be ascertained that, in the case of FIG. 5, among the respective storage tiers STs configuring the virtual volume pool VVP, the reliability and response performance of the storage tier ST configured of the storage area provided by the SSDs is the highest, that the reliability and response performance of the storage tier ST configured of the storage area provided by the FC hard disk devices is the second highest, and that the reliability and response performance of the storage tier ST configured of the storage area provided by the SATA hard disk devices is the lowest.

Meanwhile, in the storage apparatus 5, virtual volumes VVOLs which are one or more virtual logical volumes are defined, and these virtual volumes VVOLs are provided to the host computer 3. To each of the virtual volumes VVOLs, a respectively unique identifier (hereinafter referred to as the "LUN" (Logical Unit Number)) is provided. Furthermore, the area in the virtual volume VVOL is divided into a specified size of blocks (hereinafter referred to as the "logical blocks"), and respectively unique numbers (LBAs: Logical Block Addresses) are provided to these logical blocks. Then, the data read/write for the virtual volume VVOL by the host computer 3 is performed with the combination of the LUN and the LBA as an address and in units of logical blocks for which the relevant address is specified.

Each virtual volume VVOL is made to correspond to any one of the virtual volume pools VVPs respectively defined in the storage apparatus 5. Then, if a data write request for the virtual volume VVOL is issued from the host computer 3 to the storage apparatus 5 and if no storage area is assigned to a logical block specified by the write request in the virtual volume VVOL specified by the write request, the required amount of storage area is assigned from the virtual volume pool VVP made to correspond to the virtual volume VVOL to the logical block in units of a specified size referred to as a page.

Here, a page is a basic unit of the storage area which is assigned from a storage tier ST configuring a virtual volume pool VVP to a corresponding virtual volume VVOL. Hereinafter, one page and one logical block of the virtual volume VVOL are assumed to be the same size. Therefore, in case of this embodiment, to one logical block of the virtual volume VVOL, one page should be assigned from the virtual volume pool VVP. Then, the data from the host computer 3 is written to the page assigned to the logical block specified by a write request in the virtual volume VVOL specified by the write request and, subsequently, data read/write for the logical block results in being performed for the page.

Meanwhile, the storage apparatus 5, in parallel with the above-mentioned page assignment processing for the virtual volume VVOL, monitors the access frequency of the virtual volume VVOL for each logical block from the host computer 3 per unit of time. Then, the storage apparatus 5, in accordance with the access frequency per unit of time, regularly or irregularly, performs the data reallocation processing for changing (reassigning) the storage tier ST to assign a page to the logical block in the virtual volume VVOL to another storage tier ST as needed.

As more specifically described, the storage apparatus 5, in accordance with the access frequency per unit of time, for assigning a page from a storage tier ST of higher response performance and reliability among the storage tiers STs configuring the corresponding virtual volume pool VVP to the logical block whose access frequency is high and for assigning a page from a storage tier ST of lower response performance and reliability among the storage tiers STs configuring the relevant virtual volume pool VVP to the logical block whose access frequency is low, controls the corresponding storage devices 30 for migrating (moving) data among the storage tiers STs as needed.

(2) Tiered Data Management Method by This Embodiment

Tiered data management method by this embodiment adopted by the computer system 1 is now described.

One of the characteristics of the storage apparatus 5 by this embodiment is that, for each application 16, a virtual volume VVOL with which the application 16 reads/writes data, one or more storage tiers STs which assign pages to the virtual volume VVOL, and the priority (order of priority) of the respective storage tiers STs among these storage tiers STs can be set as a policy related to the application 16 (hereinafter referred to as the "virtual volume page assignment policy").

Then, the storage apparatus 5, if an application 16 installed in the host computer 3 issues a data write request to a virtual volume VVOL or [the storage apparatus 5] performs the data reallocation processing, in accordance with the relevant virtual volume page assignment policy, for the logical block to which the data is to be written or was written in the virtual volume VVOL, among one or more storage tiers STs made to correspond to the virtual volume VVOL (to be more exact, the corresponding application 16), assigns or reallocates pages from the storage tier ST capable of page assignment and, at the same time, of higher priority (in the higher order of priority).

Furthermore, in the computer system 1, another characteristic is that, at this step, as for the data of the same file, pages are assigned to the logical block to which the data is to be written or was written in the virtual volume VVOL from the same type of storage tier ST.

Therefore, the storage apparatus 5, for example, if an application 16 writes the data of the same file to multiple logical blocks in the virtual volume VVOL or [the storage apparatus 5] performs the data reallocation processing, among the storage tiers STs made to correspond to the virtual volume VVOL, assigns or reallocates pages from the storage tier ST capable of assigning the required number of pages and, at the same time, of higher priority.

As a means for realizing the above-mentioned data management method by this embodiment, in the memory 21 of the management computer 4, as shown in FIG. 3, the virtual volume page assignment policy setting program 25, the data/page mapping setting program 26, the apparatus table 27, the virtual volume assignment policy management table 28, and the data/page mapping management table 29 are stored.

The virtual volume page assignment policy setting program 25 is a program for showing a GUI (Graphic User Interface) screen for creating a virtual volume page assignment policy for each virtual volume VVOL installed in the host computer 3 (hereinafter referred to as the "virtual volume page assignment policy setting screen") to the system administrator and, by using this virtual volume page assignment policy setting screen, setting the virtual volume page assignment policy created by the system administrator in the storage apparatus 5.

Furthermore, the data/page mapping setting program 26 is a program for showing a GUI screen for the system administrator to specify the correspondence relationship between the data written to a virtual volume VVOL by the application 16 and the page assigned to the area where the data is to be written in the relevant virtual volume VVOL (hereinafter referred to as the "data/page mapping setting screen") to the system administrator and, by using this data/page mapping setting screen, setting the relevant data-and-page correspondence relationship specified by the system administrator in the storage apparatus 5.

The apparatus table 27 is a table for the management computer 4 to manage the host computers 3 and the storage apparatus 5 existing in the computer system 1 and, as shown in FIG. 6, is configured of an apparatus ID field 27A, an apparatus type field 27B, an apparatus information field 27C, and an IP address field 27D.

Then, in the apparatus ID field 27A, an identifier provided to each of the host computers 3 and the storage apparatus 5 existing in the computer system 1 (apparatus ID) is stored while, in the apparatus type field 27B, the apparatus type of the corresponding apparatus (storage apparatus or host computer) is stored.

Furthermore, in the apparatus information field 27C, information such as the vendor name, model, serial number of the corresponding apparatus is stored while, in the IP address field 27D, an IP address of the corresponding apparatus in accessing the apparatus is stored.

Therefore, FIG. 6 shows, for example, that a "storage apparatus" named "ST1" is a model named "vendor A1" of a vendor named "vendor A," that the serial number of the same is "10," and that the IP address is "10.10.10.10."

The virtual volume page assignment policy management table 28 is a table for the management computer 4 side to manage the virtual volume page assignment policy created by the system administrator by using the virtual volume page assignment policy setting screen 50 (FIG. 13) which is described later and, as shown in FIG. 7, is configured of a policy ID field 28A, a server ID field 28B, an application ID field 28C, a virtual volume list field 28D, and a storage tier allocation order field 28E.

Then, in the policy ID field 28A, an identifier provided to the corresponding virtual volume page assignment policy is stored. Meanwhile, in the application field 28C, an identifier of the corresponding application 16 is stored while, in the server ID field 28B, an identifier of the host computer 3 where the application 16 is installed is stored.

Furthermore, in the virtual volume list field 28D, identifiers of all the virtual volumes VVOLs with which the corresponding application 16 reads/writes data are stored and, in the storage tier allocation order field 28E, one or more storage tiers STs to assign pages if data is written to these virtual volumes VVOLs are stored in order of priority.

Therefore, FIG. 7 shows that a virtual volume page assignment policy named "Policy 1" is a regulation of an application 16 named "AP1" installed in a host computer 3 named "H1" and that, by this virtual volume page assignment policy, to the virtual volumes VVOLs named "v101" and "v102" with which the application 16 reads/writes data, three storage tiers STs named "Tier0," "Tier1," and "Tier2" are made to correspond in this order of priority.

The data/page mapping management table 29 is a table for the management computer 4 side to manage the data-and-page correspondence relationship specified by the system administrator by using the data/page mapping setting screen 60 (FIG. 14) which is described later and, as shown in FIG. 8, is configured of a mapping ID field 29A, an application ID field 29B, a data ID field 29C, a virtual volume ID field 29D, and a corresponding page field 29E.

Then, in the mapping ID field 29A, an identifier provided to the corresponding data-and-page correspondence relationship is stored. Furthermore, in the application ID field 29B, an identifier of the corresponding application 16 is stored while, in the data ID field 29C, an identifier of the data provided to the data of the corresponding application 16 is stored. Furthermore, in the virtual volume ID field 29D, an identifier of the virtual volume VVOL where the data is to be stored is stored and, in the corresponding page field 29E, identifiers of the respective pages respectively assigned to all the logical blocks where the data is stored in the virtual volume VVOL are respectively stored.

Therefore, FIG. 8 shows that the data named "data 1a" used by the application 16 named "AP1" is stored in two logical blocks to which pages named "p01" and "p02" in the virtual volume VVOL named "VOL1" are respectively assigned, and that an identifier named "Map01" is provided to the correspondence relationship between the data named "data 1a" and the pages named "p01" and "p02."

Meanwhile, as a means for adopting the above-mentioned data management method by this embodiment, as shown in FIG. 4, a virtual volume control program 35A is installed in the microprogram 35 stored in the memory 32 of the storage apparatus 5 and, in this memory 32, the virtual volume management table 36, the virtual volume page assignment management table 37, the virtual volume pool management table 38, the storage tier management table 39, the virtual volume page assignment policy management table 40, and the data/page mapping management table 41 are stored.

Among the above, the virtual volume control program 35A of the storage apparatus 5 is a program for performing the processing such as, in accordance with the data write from each application 16 to the virtual volume VVOL, complying with the above-mentioned virtual volume page assignment policy specified in advance, assigning pages to the virtual volume VVOL from the virtual volume pool VVP (FIG. 5).

Furthermore, the virtual volume management table 36 is a table used for the virtual volume control program 35A to manage the virtual volumes VVOLs defined in the local storage apparatus 5 and, as shown in FIG. 9, is configured of a virtual volume ID field 36A, a host assignment status field 36B, a virtual capacity field 36C, a threshold field 36D, and an assigned capacity field 36E.

Then, in the virtual volume ID field 36A, an identifier of each virtual volume VVOL defined in the storage apparatus 5 comprising the relevant virtual volume management table 36 is stored. Furthermore, in the host assignment status field 36B, the information whether any host computer 3 is assigned as the data write destination for the corresponding virtual volume VVOL ("Allocated" if assigned and "Unallocated" if not assigned) is stored. Note that, if a host computer 3 is assigned to the virtual volume VVOL, in the host assignment status field 36B, a port ID ("PID") of the port of the host computer 3 connected to the virtual volume VVOL and an identification number ("LUN") of the virtual volume VVOL in the host computer 3 are stored.

Furthermore, in the virtual capacity field 36C, a capacity of the corresponding virtual volume VVOL is stored and, in the threshold field 36D, a threshold of the used capacity set in advance for the virtual volume VVOL is stored. If the used capacity of the corresponding virtual volume VVOL exceeds this threshold, an alert of that information should be notified to the system administrator. Furthermore, in the assigned capacity field 36E, the currently used capacity of the corresponding virtual volume VVOL is stored.

Therefore, FIG. 9 shows, for example, that a virtual volume VVOL named "v101" is set to be "10 GB" in capacity and "6 GB" as the threshold, that any of the host computers 3 is already assigned ("Allocated"), and that the capacity of "6 GB" is used by the host computer 3.

The virtual volume page assignment management table 37 is a table used by the virtual volume control program 35A for managing the page assignment status for the virtual volumes VVOLs defined in the local storage apparatus 5 and, as shown in FIG. 10, is configured of a virtual volume ID field 37A, a pool ID field 37B, an assigned LBA field 37C, an assigned page field 37D, and an I/O frequency field 37E.

Then, in the virtual volume ID field 37A, an identifier of each virtual volume VVOL defined in the storage apparatus 5 comprising the relevant virtual volume page assignment management table 37 is stored and, in the pool ID field 37B, an identifier of the virtual volume pool VVP made to correspond as an assignment source to assign pages to the corresponding virtual volume VVOL is stored.

Furthermore, in the assigned LBA field 37C, an LBA of a logical block to which a page is already assigned among the logical blocks in the corresponding virtual volume VVOL is stored and, in the assigned page field 37D, an identifier of the page assigned to the relevant logical block is stored. Furthermore, in the I/O frequency field 37E, the I/O frequency per unit of time for the data stored in the corresponding page from the host computer 3 is stored.

Therefore, FIG. 10 shows that a virtual volume pool VVP whose pool ID is "Pool1" is made to correspond to a virtual volume VVOL named "v101," that the pages whose identifiers are "p01," "p02," and "p03" respectively are assigned to the logical blocks whose LBAs are "[0 GB]-[2 GB]," "[2 GB]-[4 GB]," and "[4 GB]-[6 GB]" in the virtual volume VVOL, and that the access frequencies per unit of time for the data respectively stored in the pages whose identifiers are "p01," "p0 2," and "p03" from the host computer 3 are "100," "200," and "80."

The virtual volume pool management table 38 is a table used by the virtual volume control program 35A for managing the virtual volume pools VVPs defined in the local storage apparatus 5 and, as shown in FIG. 11, is configured of a pool ID field 38A, a page ID field 38B, a corresponding virtual volume pool field 38C, an LBA field 38D, and a virtual volume assignment status field 38E.

Then, in the pool ID field 38A, an identifier of each virtual volume pool VVP defined in the storage apparatus 5 comprising the relevant virtual volume pool management table 38 is stored and, in the page ID field 38B, an identifier respectively provided to each of the pages in the corresponding virtual volume pool VVP is stored. Furthermore, in the corresponding virtual volume pool field 38C, an identifier and a capacity of the pool volume PVOL (FIG. 5) which provides the corresponding page in the corresponding virtual volume pool VVP are stored.

Then, in the LBA field 38D, an LBA of the corresponding page in the corresponding pool volume PVOL is stored and, in the virtual volume assignment status field 38E, the information indicating whether the corresponding page is assigned to any virtual volume VVOL ("Allocated" if assigned and "Unallocated" if not assigned) and, if assigned, an identifier of the assignment destination virtual volume VVOL are stored.

Therefore, the example of FIG. 11 shows that the pages named "p01" to "p05" of a virtual volume pool VVP named "pool1" are provided by a pool volume PVOL named "v201" comprising the capacity of "10 GB" and that, among these pages, the storage area whose LBAs are "[0 GB]-[2 GB]" is already assigned to a virtual volume VVOL named "v101" ("Allocated").

The storage tier management table 39 is a table used by the virtual volume control program 35A for managing the storage tiers STs defined in the local storage apparatus 5 and, as shown in FIG. 12, is configured of a storage tier ID field 39A, a parity group ID field 39B, a corresponding storage device field 39C, a media type field 39D, and a pool volume ID field 39E.

Then, in the storage tier ID field 39A, an identifier of each storage tier ST defined in the storage apparatus 5 comprising the relevant storage tier management table 39 is stored and, in the parity group ID field 39B, an identifier of a parity group PG configuring the corresponding storage tier ST is stored. Furthermore, in the corresponding storage device field 39C, all the identifiers of the respective storage devices 30 configuring the corresponding parity group PG are stored and, in the media type field 39D, the type of these storage devices 30 (SSD, FC, SATA or others) is stored. Furthermore, in the pool volume ID field 39E, an identifier of a pool volume PVOL configuring the corresponding storage tier ST is stored.

Therefore, FIG. 12 shows that a storage tier ST named "Tier0" is configured of a pool volume PVOL named "v201," and that this pool volume PVOL is defined in the storage area provided by a parity group PG named "PGO1" configured of four storage devices 30 named "a0," "a1," "a2," and "a3" whose type is "SSD."

The virtual volume assignment policy management table 40 is a table for the storage apparatus 5 to manage the above-mentioned virtual volume assignment policy created by the system administrator and comprises the same configuration as the virtual volume assignment policy management table 28 in the management computer 4, and therefore the description of the same is omitted at this point.

Furthermore, the data/page mapping management table 41 is also a table for the management computer 4 to manage the correspondence relationship between data and pages specified by the system administrator as described above and comprises the same configuration as the data/page mapping management table 29 in the management computer 4, and therefore the description of the same is omitted at this point.

Figure 13:
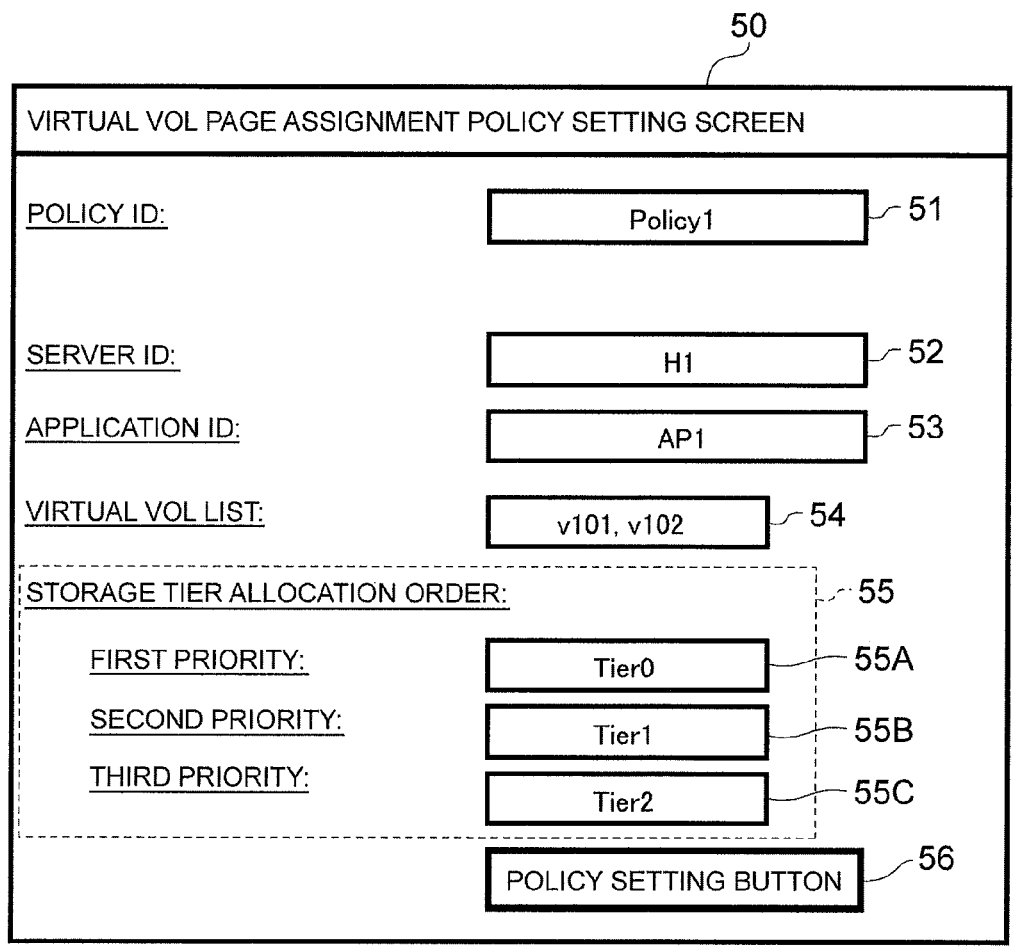
FIG. 13 is an outlined line diagram showing the skeleton framework of a virtual volume page assignment policy setting screen.

(3) Various Types of Screen Configurations (3-1) Virtual Volume Page Assignment Policy Setting Screen FIG. 13 shows the screen configuration of the virtual volume page assignment policy setting screen 50 displayed on the management computer 4 by starting up the virtual volume page assignment policy setting program 25 (FIG. 3) of the management computer 4.

The virtual volume page assignment policy setting screen 50 is, as described above, a GUI screen on which the system administrator sets from which storage tier ST and in what type of priority the pages should be assigned to the virtual volume VVOL with which the application 16 reads/writes data and, as shown in FIG. 13, is configured of a policy ID field 51, a server ID field 52, an application ID field 53, a virtual volume list field 54, a storage tier allocation order unit 55, and a policy setting button 56.

Among the above, the policy ID field 51 is a field for the system administrator or others to specify (input) an identifier of a virtual volume page assignment policy to be set at that time, and the application ID field 53 and the server ID field 52 are the fields for respectively specifying an identifier of the application 16 which is the target at that time and an identifier of the host computer 3 in which the application 16 is installed. Furthermore, the virtual volume list field 54 is a field for specifying an identifier of the virtual volume VVOL with which the application 16 reads/writes data.

The storage tier allocation order unit 55 is [a set of] fields for specifying the storage tiers STs to assign pages when the application 16 input in the application ID field 53 writes data to the virtual volume VVOL and the priority of these, which is configured of a first priority field 55A, a second priority field 55B, and a third priority field 55C. The system administrator or others can specify the storage tiers STs desired as the storage tiers STs to assign pages when the relevant application 16 writes data to the virtual volume VVOL by inputting the identifiers of the same in the first priority field 55A, the second priority field 55B, and the third priority field 55C in order of priority.

However, it is not necessary to input the identifiers of the storage tiers STs in all of these fields, the first priority field 55A, the second priority field 55B, and the third priority field 55C, and it may also be permitted to input the identifiers of the storage tiers STs in a part of the first priority field 55A, the second priority field 55B, and the third priority field 55C. By this method, the storage tier ST to assign pages when the corresponding application 16 writes data to the virtual volume VVOL can be limited more specifically. For example, by inputting "Tier0" in the first priority field 55A and "Tier1" in the second priority field 55B respectively and leaving the third priority field 55C blank, the storage tiers STs to assign pages when the corresponding application 16 writes data to the virtual volume VVOL can be limited to only the two storage tiers STs, that is, "Tier0" and "Tier1."

The policy setting button 56 is a button for setting a virtual volume page assignment policy comprising the contents respectively input in the policy ID field 51, the server ID field 52, the application ID field 53, the virtual volume list field 54, and the storage tier allocation order unit 55 in the storage apparatus 5. The virtual volume page assignment policy setting program 25, if the policy setting button 56 is clicked after the required contents are input in the policy ID field 51, the server ID field 52, the application ID field 53, the virtual volume list field 54, and the storage tier allocation order unit 55 respectively, transfers the contents input by the system administrator on this virtual volume page assignment policy setting screen 50 with a setting command to the storage apparatus 5. Then, the storage apparatus 5 inputs the relevant setting command, and internally sets the setting contents on the virtual volume page assignment policy setting screen 50 provided with this setting command.

Note that, as for an identifier of a virtual volume page assignment policy, instead of being specified by the system administrator on the virtual volume page assignment policy setting screen 50, for example, the virtual volume page assignment policy setting program 25 may also determine the number in accordance with a specified rule.

Furthermore, if an identifier of the virtual volume VVOL corresponding to the virtual volume list field 54 is input on the virtual volume page assignment policy setting screen 50, it may also be made possible to omit the input in the server ID field 52 and the application ID field 53. This is because, even if storage tiers STs and the priority of these are set for the application 16, the application 16 which wrote the data in the virtual volume VVOL cannot be identified by the storage apparatus 5 side, and eventually, the storage apparatus 5 can only perform the type of processing in which, if data is written to this logical block of this virtual volume VVOL, pages are assigned from this storage tier ST in this order of priority.

Furthermore, in the storage tier allocation order unit 55, the priority of the storage tiers STs may also be specified by the disk type or the identifier of the parity group PG.

(3-2) Data/Page Mapping Setting Screen

Figure 14:
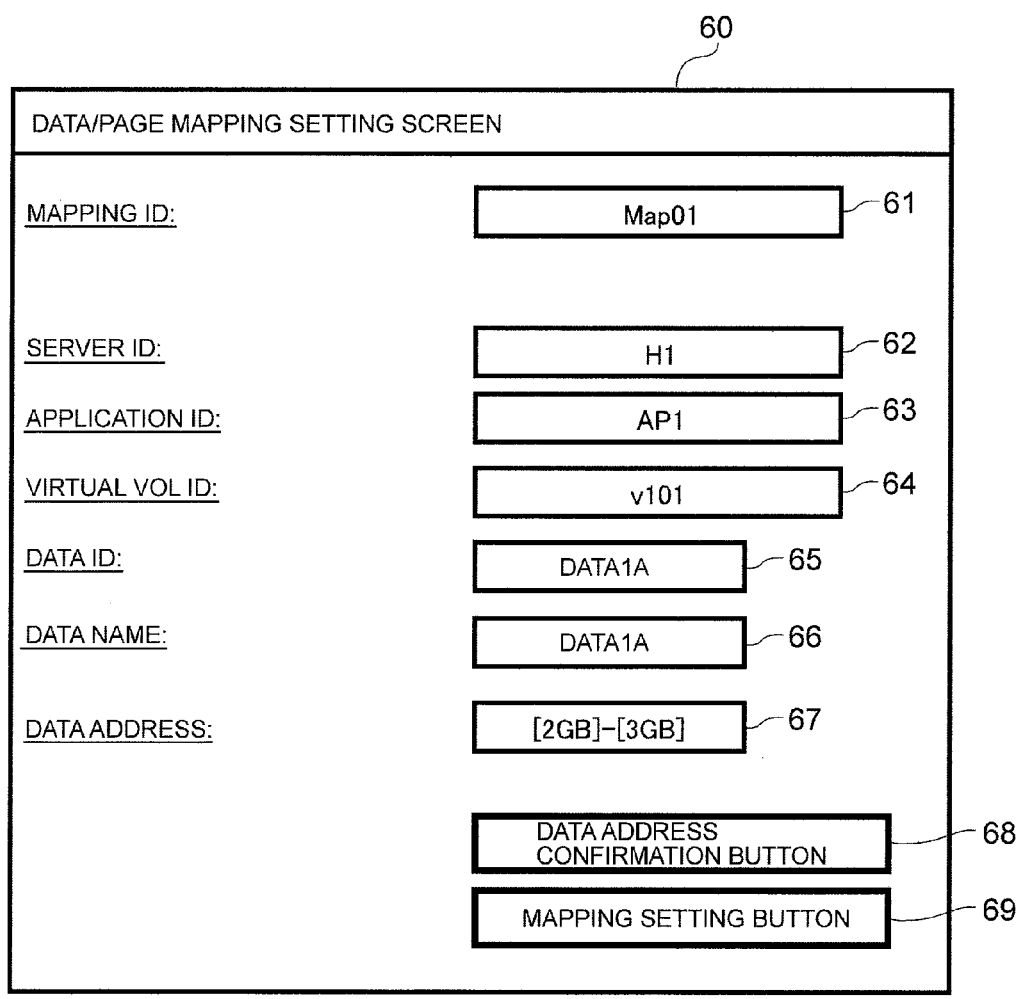
FIG. 14 is an outlined line diagram showing the skeleton framework of a data/page mapping setting screen.

Meanwhile, FIG. 14 shows the screen configuration of the data/page mapping setting screen 60 displayed on the management computer 4 by starting up the data/page mapping setting program 26 (FIG. 3) of the management computer 4.

The data/page mapping setting screen 60 is, as described above, a GUI screen for setting the correspondence relationship between the data written to the virtual volume VVOL by the application 16 installed in the host computer 3 and the area (pages in the virtual volume VVOL) to which the data is to be written in the relevant virtual volume VVOL and, as shown in FIG. 14, is configured of a mapping ID field 61, a server ID field 62, an application ID field 63, a virtual volume ID field 64, a data ID field 65, a data name field 66, a data address field 67, a data address confirmation button 68, and a mapping setting button 69.

Among the above, the mapping ID field 61 is a field for the system administrator to specify (input) identifiers to be provided to the data and pages which are made to correspond to each other, and the application ID field 63 and the server ID field 62 are the fields for respectively specifying an identifier of the corresponding application 16 and an identifier of the host computer 3 in which the application 16 is installed.

Furthermore, the virtual volume ID field 64 is a field for specifying an identifier of the virtual volume VVOL with which the application 16 reads/writes data, and the data ID field 65 is a field for specifying an identifier of the data which the relevant application 16 writes to the relevant virtual volume VVOL. Furthermore, the data name field 66 is a field for specifying a data name (e.g. file name) of the data.

Furthermore, the data address field 67 is a field for specifying a range of the area in the relevant virtual volume VVOL searched by the system administrator in advance to which the relevant data is written. However, this range, as described later, can be displayed on the data address field 67 by clicking the data address confirmation button 68 after inputting the data name in the data name field 66.

The data address confirmation button 68 is a button for making the data/page mapping setting program 26 search the range of the area in the relevant virtual volume VVOL to which the relevant data is written. The data/page mapping setting program 26, if the data address confirmation button 68 is clicked after an identifier of the host computer 3 corresponding to the server ID field 62 is input and a data name is input in the data name field 66, issues a command for searching the address of the data to the host computer 3 whose identifier is stored in the server ID field 52, and displays the address acquired by that method on the data address field 67.

Further, the mapping setting button 69 is a button for setting the data-and-page correspondence relationship set on this data/page mapping setting screen 60. The data/page mapping setting program 26, if the mapping setting button 69 is clicked after the required contents are input in the server ID field 62, the application ID field 63, the virtual volume ID field 64, the data ID field 65, the data name field 66, and the data address field 67, transfers the contents input by the system administrator on this data/page mapping setting screen 60 with a setting command to the storage apparatus 5. Then, the storage apparatus 5 inputs the relevant setting command, and internally sets the setting contents on the data/page mapping setting screen 60 provided with this setting command.

Note that, as for a mapping ID, instead of being specified by the system administrator on the data/page mapping setting screen 60, for example, the data/page mapping setting program 26 may also determine the number in accordance with a specified rule.

Furthermore, if an identifier of the virtual volume VVOL corresponding to the virtual volume ID field 64 is input on the data/page mapping setting screen 60, it may also be made possible to omit the input in the server ID field 62 and the application ID field 63.

(4) Various Types of Processing Related to Data Management Method by This Embodiment The procedures of various types of processing related to the above-mentioned data management method by this embodiment are now described. Note that, hereinafter, though each type of processing is described by assuming a "program" to mainly perform each type of processing, it goes without saying that, actually, in accordance with the "program," the corresponding processing is performed by the processor 20 of the management computer 4 or the controller 31 of the storage apparatus 5.

(4-1) Virtual Volume Page Assignment Policy Setting Processing

Figure 15:
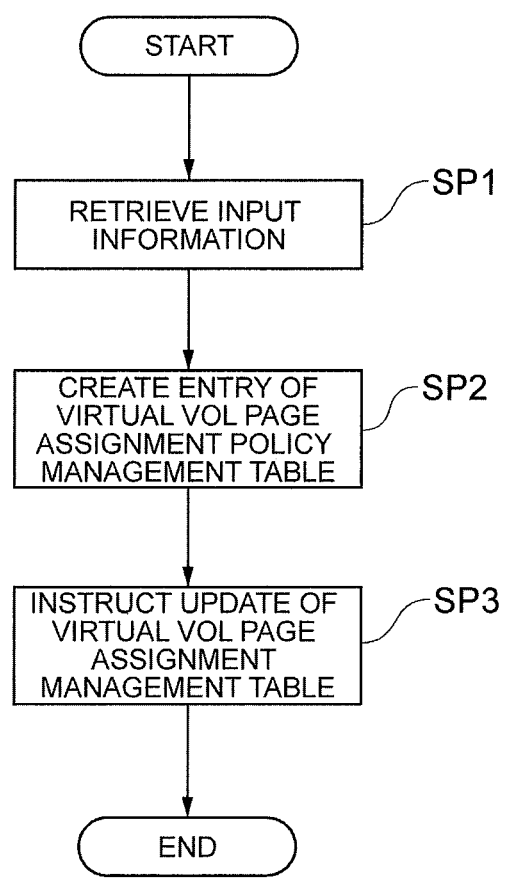
FIG. 15 is a flowchart showing the procedure of the virtual volume page assignment policy setting processing.

FIG. 15 shows the procedure of the virtual volume page assignment policy setting processing performed by the virtual volume page assignment policy setting program 25 (FIG. 3) of the management computer 4 if the policy setting button 56 on the virtual volume page assignment policy setting screen 50 (FIG. 13) is clicked.

The virtual volume page assignment policy setting program 25, if the relevant policy setting button 56 is clicked after the required information is input on the virtual volume page assignment policy setting screen 50, starts the virtual volume page assignment policy setting processing shown in this FIG. 15.

Then, the virtual volume page assignment policy setting program 25 foremost retrieves the respective types of information input by the system administrator on the relevant virtual volume page assignment policy setting screen 50, such as the identifier of the target application 16, the identifier of the corresponding virtual volume VVOL, and the identifier of the storage tier ST specified for the application 16 (SP1).

Subsequently, the virtual volume page assignment policy setting program 25 creates a new entry in the virtual volume page assignment policy management table 28 (FIG. 7) in the management computer 4, and respectively stores the corresponding information retrieved at step SP1 in the respective fields of the created entry (the policy ID field 28A, the server ID field 28B, the application ID field 28C, the virtual volume list field 28D, and the storage tier allocation order field 28F) (SP2).

Subsequently, the virtual volume page assignment policy setting program 25 transfers an instruction for updating the virtual volume page assignment policy management table 28 with the information acquired at step SP1 related to the new virtual volume page assignment policy to the storage apparatus 5 (SP3). By this method, the virtual volume control program 35A of the storage apparatus 5 (FIG. 4), in accordance with the relevant update instruction, creates a new entry in the virtual volume page assignment policy management table 40 (FIG. 4) in the relevant storage apparatus 5, and respectively stores the corresponding information transmitted from the management computer 4 at this step in the respective fields of the created entry.

Then, the virtual volume page assignment policy setting program 25 thereafter terminates this virtual volume page assignment policy setting processing.

(4-2) Data/Page Mapping Setting Processing

Figure 16:
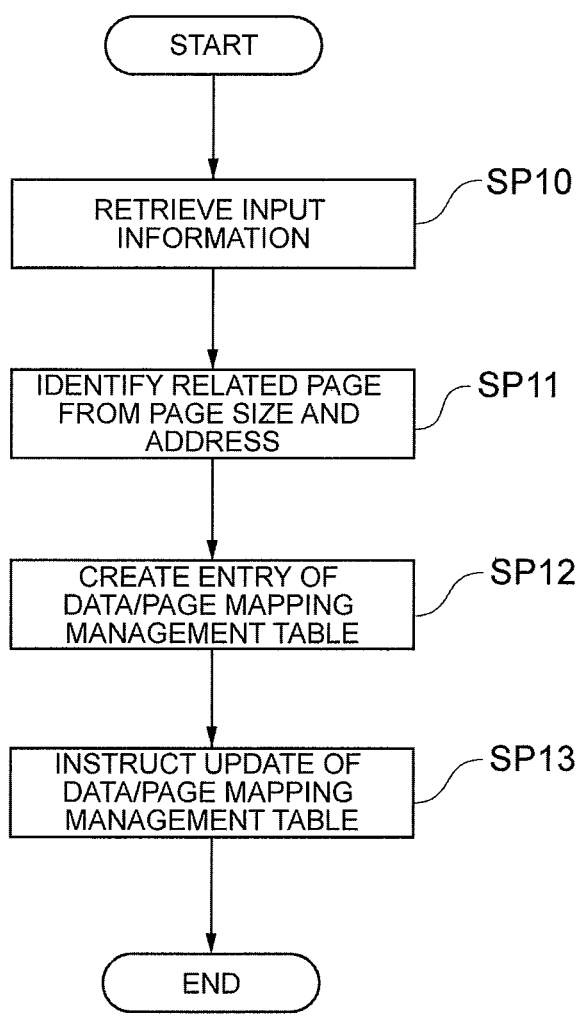
FIG. 16 is a flowchart showing the procedure of the data/page mapping setting processing.

Meanwhile, FIG. 16 shows the procedure of the data/page mapping setting processing performed by the data/page mapping setting program 26 (FIG. 3) of the management computer 4 if the mapping setting button 69 on the data/page mapping setting screen 60 (FIG. 14) is clicked.

The data/page mapping setting program 26, if the relevant policy setting button 56 is clicked after the required information is input on the data/page mapping setting screen 60, starts the virtual volume page assignment policy setting processing shown in this FIG. 16.

Then, the data/page mapping setting program 26 foremost retrieves the respective types of information input by the system administrator on the relevant data/page mapping setting screen 60, such as the identifier of the application 16, the identifier and data name of target data, and the data storage location (data address) in the corresponding virtual volume VVOL (SP10).

Subsequently, the data/page mapping setting program 26, in accordance with the size of each page which is specified in advance and the storage location in the virtual volume VVOL of the data as the target at that time, identifies all the pages (hereinafter referred to as the "related pages") assigned to the area where the data is stored in the virtual volume VVOL (SP11).

Subsequently, the data/page mapping setting program 26 creates a new entry in the data/page mapping management table 29 (FIG. 8) in the management computer 4, and respectively stores the corresponding information retrieved at step SP10 in the respective fields of the created entry (the mapping ID field 29A, the application ID field 29B, the data ID field 29C, the virtual volume ID field 29D, and the corresponding page field 29E) (SP12).

Furthermore, the data/page mapping setting program 26 transfers an instruction for updating the data/page mapping management table 29 with the information acquired at step SP10 related to the new data-and-page correspondence relationship (hereinafter referred to as the "mapping information") to the storage apparatus 5 (SP13). By this method, the virtual volume control program 35A of the storage apparatus 5, in accordance with the relevant update instruction, creates a new entry in the data/page mapping management table 41 in the relevant storage apparatus 5, and respectively stores the corresponding information transmitted from the management computer 4 at this step in the respective fields of the created entry.

Then, the data/page mapping setting program 26 thereafter terminates this data/page mapping setting processing.

(4-3) Page Allocation Processing

Figure 17:
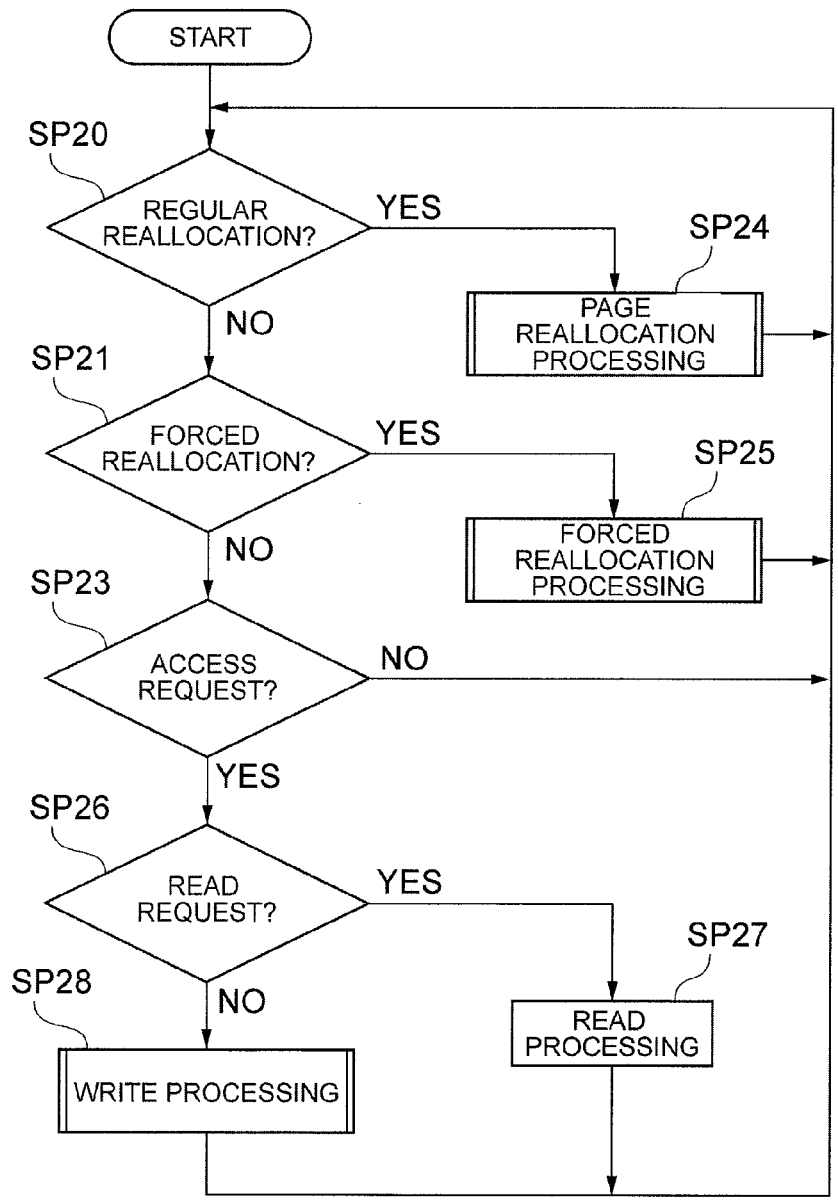
FIG. 17 is a flowchart showing the procedure of the page allocation processing.

FIG. 17 shows the procedure of the page allocation processing performed by the virtual volume control program 35A (FIG. 4) of the storage apparatus 5. The virtual volume control program 35A, in accordance with the procedure shown in this FIG. 17, allocates or reallocates the pages for the virtual volume VVOL.

That is, the virtual volume control program 35A, if the storage apparatus 5 is started up, starts this page allocation processing and, foremost, sequentially determines whether it is the timing for performing page reallocation by the schedule specified in advance or not, whether a request for performing forced reallocation is issued from the management computer 4 or not, and whether an access request (write request or read request) is issued from any of the host computers 3 (SP20 to SP23).

The virtual volume control program 35A, if acquiring negative results from all of these determinations, repeats the loop from step SP20 to step SP23 and to the SP20.

Then, the virtual volume control program 35A, if acquiring an affirmative result at step SP20 as it is almost the timing for performing page reallocation, performs the page reallocation processing for changing the storage tier ST assigning a page to the logical block where the data is stored in the virtual volume VVOL to another storage tier ST as needed (SP24) and thereafter returns to step SP20.

Furthermore, the virtual volume control program 35A, if acquiring an affirmative result at step SP21 as a forced reallocation request is about to be received from any of the host computers 3, performs the forced reallocation processing for assigning a page from a storage tier ST different from the current storage tier ST to the logical block of the virtual volume VVOL where the data specified by the relevant forced reallocation request is stored (SP25) and thereafter returns to step SP20.

Meanwhile, the virtual volume control program 35A, if acquiring an affirmative result at step SP23 as an access request from any of the host computers 3 is about to be received, determines whether the access request is a read request (SP26).

Then, the virtual volume control program 35A, if acquiring an affirmative result at this determination, reads the data specified by the read request from the corresponding logical block in the corresponding virtual volume VVOL (to be more exact, from the storage device 30 configuring the corresponding storage tier ST), transmits this to the host computer 3 as the transmission source of the relevant read request (SP27), and then returns to step SP20.

Meanwhile, the virtual volume control program 35A, if acquiring a negative result at the determination of step SP24, to the logical blocks of the virtual volume VVOL specified by the write request as the write destination of the write target data, assigns a required amount of pages from any of the storage tiers STs in accordance with the virtual volume page assignment policy, and writes the write target data to the pages (SP28). Then, the virtual volume control program 35A thereafter returns to step SP20.

(4-4) Page Reallocation Processing

Figure 18:
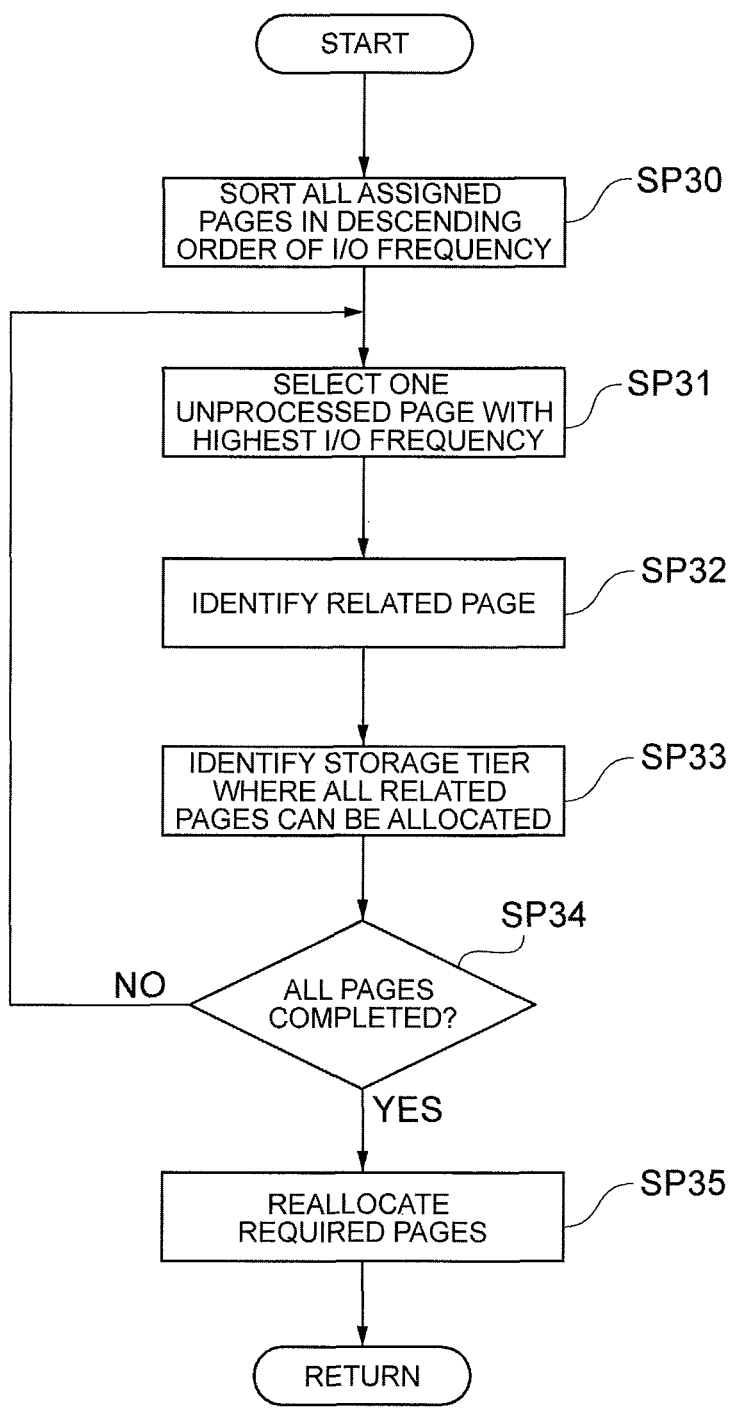
FIG. 18 is a flowchart showing the procedure of the page reallocation processing.

FIG. 18 shows the concrete procedure of the page reallocation processing performed by the virtual volume control program 35A at step SP24 in the page allocation processing described above in accordance with FIG. 17.

By this computer system 1, the page reallocation processing for changing the page assignment source for the logical block where data write is performed in the virtual volume VVOL from the current storage tier ST to another storage tier ST can be performed by the schedule, regularly or irregularly.

Actually, the user or the system administrator, by operating the host computer 3 or the management computer 4, can create the relevant schedule and set the same in the storage apparatus 5. Then, the virtual volume control program 35A of the storage apparatus 5 continuously monitors the relevant schedule, proceeds to step SP26 of the page allocation processing (FIG. 17) as it is almost the timing for performing the page reallocation processing, and then starts the page reallocation processing shown in this FIG. 18.

Then, the virtual volume control program 35A starts this page reallocation processing, foremost refers to the virtual volume page assignment management table 37 (FIG. 10), and sorts all the pages assigned to any of the virtual volumes VVOLs defined in the storage apparatus 5 in descending order of I/O frequencies for the data stored in the pages from the host computer 3 (SP30).

Subsequently, the virtual volume control program 35A, from the assigned pages sorted at step SP30, selects one page whose I/O frequency for the data stored in the page from the host computer 3 is the highest (SP31).

Subsequently, the virtual volume control program 35A refers to the data/page mapping management table 41 (FIG. 4), and identifies all the pages where the data in the same file as the data stored in the page selected at step SP31 is stored (all the related pages to the page selected at step SP31) (SP32).

Furthermore, the virtual volume control program 35A refers to the virtual volume page assignment policy management table 40 and the virtual volume pool management table 38, for the data stored in the page selected at step SP31 and the data respectively stored in the respective related pages identified at step SP32, among the storage tiers STs allowed to assign pages to the data, identifies the storage tier ST which can store all of the data of the highest priority and, at the same time, stored in the page selected at step SP31 and the data respectively stored in the respective related pages identified at step SP32 (SP33).

After this, the virtual volume control program 35A determines whether the processing from step SP31 to step SP33 is completed for all the pages sorted at step SP30 (SP34).

The virtual volume control program 35A, if acquiring a negative result at this determination, returns to step SP31 and thereafter repeats the processing from step SP31 to step SP34 until an affirmative result is acquired at step SP34.

Then, the virtual volume control program 35A, if eventually acquiring an affirmative result at step SP34 by completing the processing from step SP31 to step SP33 for all the pages sorted at step SP30, for the data whose storage tier ST identified at step SP33 is different from the current storage tier ST, migrates (moves) the data from the current storage tier ST to the storage tier ST identified at step SP33 and, in accordance with this, updates the data/page mapping management table 41 (SP35). By this method, the page reallocation for switching the storage tier ST to assign a page to the logical block of the virtual volume VVOL to another storage tier ST is performed.

Then, the virtual volume control program 35A, if completing the above-mentioned page reallocation for the required logical block in the virtual volume VVOL, terminates this page reallocation processing, and returns to the page allocation processing (FIG. 17).

(4-5) Forced Reallocation Processing

Figure 19:
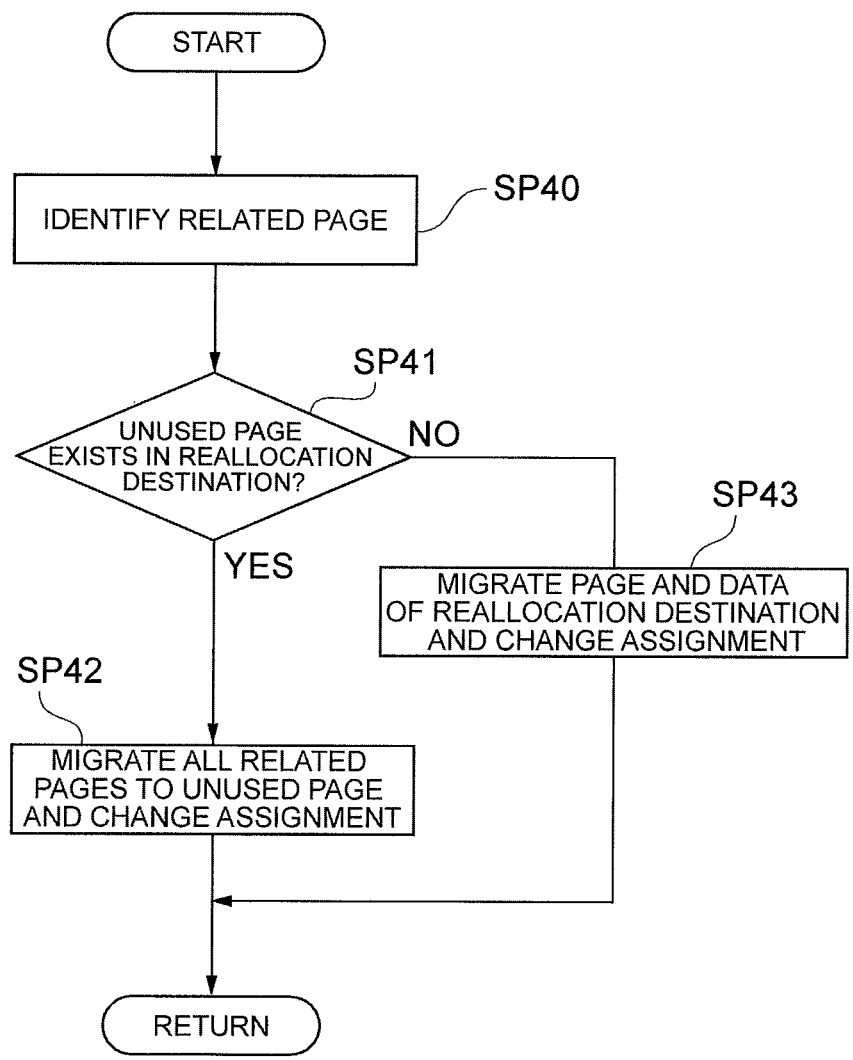
FIG. 19 is a flowchart showing the procedure of the forced reallocation processing.

FIG. 19 shows the concrete procedure of the forced reallocation processing performed by the virtual volume control program 35A at step SP25 in the page allocation processing described above in accordance with FIG. 17.

By this computer system 1, if the application 16 writes data to the virtual volume VVOL, the assignment source of the page assigned to the logical block where the data is written in the virtual volume VVOL can be changed from the current storage tier ST to another storage tier ST by the user operation.

Actually, if the user operates the host computer 3 and inputs an order for changing the assignment source of the pages assigned to the area where the desired data is written in the virtual volume VVOL to another storage tier ST, a forced reallocation request complying with this is issued from the host computer 3 to the storage apparatus 5.

Then, the virtual volume control program 35A of the storage apparatus 5, due to receiving the relevant forced reallocation request, proceeds to step SP25 in the page allocation processing described above in accordance with FIG. 17, starts the forced reallocation processing shown in this FIG. 19, foremost refers to the data/page mapping management table 41 (FIG. 4), and identifies the pages to be respectively assigned to all the logical blocks where the relevant data is written in the virtual volume VVOL where the data specified by the forced reallocation request is written (SP40).

Subsequently, the virtual volume control program 35A refers to the virtual volume pool management table 38 (FIG. 11), determines whether enough unused pages to store all the reallocation target data specified by the relevant forced reallocation request (hereinafter referred to as the "unused pages") exists in the storage tier ST specified as the reallocation destination by the relevant forced reallocation request (SP41).

The virtual volume control program 35A, if acquiring an affirmative result at this determination, controls the storage devices 30 for migrating the reallocation target data specified by the forced reallocation request to the storage tier ST specified as the reallocation destination by the forced reallocation request and, in accordance with this, updates the data/page mapping management table 41 (SP42). Then, the virtual volume control program 35A thereafter terminates this forced reallocation processing, and returns to the data allocation processing (FIG. 17).

Meanwhile, the virtual volume control program 35A, if acquiring a negative result at the determination of step SP41, by performing the same reallocation processing as the data reallocation processing described above in accordance with FIG. 18, prepares enough unused pages to store all the reallocation target data in the storage tier ST specified as the reallocation destination by the forced reallocation request. Furthermore, the virtual volume control program 35A controls the corresponding storage devices 30 for migrating the reallocation target data to the prepared unused pages and, in accordance with this, updates the data/page mapping management table 41 (SP43). Then, the virtual volume control program 35A thereafter terminates this forced reallocation processing, and returns to the data allocation processing.

(4-6) Write Processing

FIG. 20 shows the concrete procedure of the write processing performed by the virtual volume control program 35A at step SP28 in the page allocation processing described above in accordance with FIG. 17.

The virtual volume control program 35A proceeds to step SP28 of the page allocation processing, starts this write processing and, foremost, determines whether the page are already assigned to the logical block as the data write destination specified by the relevant write request in the virtual volume VVOL specified by the write request (SP50).

Then, the virtual volume control program 35A, if acquiring an affirmative result at this determination, writes the write target data provided by the host computer 3 with the relevant write request to the logical block specified by the relevant write request in the virtual volume VVOL specified by the write request (SP51), and proceeds to step SP56.

Meanwhile, the virtual volume control program 35A, if acquiring a negative result at the determination of step SP50, refers to the virtual volume page assignment policy management table 40 (FIG. 4) and the virtual volume pool management table 38 (FIG. 11) and, for the respective storage tiers STs for the data of which the priority is set, searches unused pages in order of more highly set priority of the storage tiers STs (SP52).

Sequentially, the virtual volume control program 35A, in accordance with the search result at step SP52, among the storage tiers STs for the data of which priority is set, determines whether any storage tier ST comprising enough unused pages to store all of the relevant data exists (SP53).

Then, the virtual volume control program 35A, if acquiring a negative result at this determination, transmits an alert that the data cannot be written to the virtual volume VVOL in accordance with the virtual volume page assignment policy to the host computer 3 which is the transmission source of the write request (SP54) and thereafter terminates this write processing to return to the page allocation processing.

Meanwhile, the virtual volume control program 35A, if acquiring an affirmative result at the determination of step SP53, to the data write destination area specified by the relevant write request in the virtual volume VVOL specified by the write request, assigns the unused pages in the storage tier ST for which the highest priority for the relevant data is set among the storage tiers STs comprising enough unused pages to store all of the write target data, and writes the relevant write target data to the unused pages (SP55).

Subsequently, the virtual volume control program 35A transmits a write completion notification that the write processing of the relevant write target data is completed to the host computer 3 which is the transmission source of the write request (SP56) and thereafter terminates this write processing, and returns to the page allocation processing.

(5) Advantageous Effects of This Embodiment

As described above, in this embodiment, in the storage apparatus 5, a policy associating each application 16 installed in the host computer 3 with a virtual volume VVOL with which the relevant application 16 reads/writes data, a storage tier ST to assign pages to the relevant virtual volume VVOL, and the priority of the relevant storage tier ST is managed in the virtual volume page assignment policy management table 28, in accordance with a write request from the application 16 to the virtual volume VVOL, complying with the corresponding virtual volume page assignment policy, among the storage tiers STs associated with the relevant virtual volume VVOL, pages are assigned from the storage tier ST of the higher priority to the relevant virtual volume VVOL, and therefore, for each application 16, the storage tier ST to assign pages if the application 16 writes data to the virtual volume VVOL can be limited in advance.

Therefore, for example, by associating an application 16 of high importance with a high-performance storage tier ST, if the relevant application 16 writes data to the virtual volume VVOL, it can be ensured that pages are always assigned from high-performance storage tiers ST. By this method, the performance stability operation of virtual volumes VVOLs can be realized.

Furthermore, in this Embodiment, in the storage apparatus 5, for respective logical blocks of the virtual volume VVOL where the data in the same file is stored, pages are supposed to be assigned respectively from the same type of storage tier ST, and therefore the access performances of these logical blocks can be prevented in advance from becoming uneven. By this method, the stabilized access performance for the virtual volumes VVOLs can be realized.

(6) Description of Other Embodiments

Note that, though the above-mentioned embodiment describes the case where this invention is applied to the storage apparatus 5 configured as shown in FIG. 4, this invention, not limited to this, can be broadly applied to other storage apparatuses of various types of configuration.

Furthermore, though the above-mentioned embodiment describes the case where SSDs, FC disks, and SATA disks are applied as storage devices 30 to be installed in the storage apparatus 5, to this invention, not limited to this, for example, as storage devices 30, optical disk devices loaded with optical disks or magnetic tape devices loaded with magnetic tapes may also be applied.

Furthermore, though the above-mentioned embodiment describes the case where storage tiers STs defined in the storage apparatus 5 are of three types, in this invention, not limited to this, three or more types of storage tiers STs may also be defined in the storage apparatus 5.

INDUSTRIAL APPLICABILITY

This invention can be broadly applied to storage apparatuses of various types of configuration in which the tiered data management function is installed

REFERENCE SIGN LIST

1: computer system, 3: host computer, 4: management computer, 5: storage apparatus, 16: application, 20: processor, 25: virtual volume page assignment policy setting program, 26: data/page mapping setting program, 27: apparatus table, 28, 40: virtual volume page assignment policy management table, 29, 41: data/page mapping management table, 30: storage device, 31: controller, 35A: virtual volume control program, 36: virtual volume management table, 37: virtual volume assignment management table, 38: virtual volume pool management table, 39: storage tier management table, 50: virtual volume page assignment policy setting screen, 60: data/page mapping setting screen, PVOL: pool volume, ST: storage tier.

The invention claimed is:

1. A storage system, comprising:
a plurality of types of storage devices with different performances; and
a controller for providing a plurality of pool areas from a plurality of storage areas provided by the plurality of types of storage devices as a plurality of different types of storage tiers, and providing a plurality of virtual volumes to a host computer,
wherein the controller is configured to:
manage respective policies of a plurality of applications associating an application of the host computer, one of the virtual volumes that the application reads data from and writes data to, storage tiers whose pool areas are to be allocated to the virtual volume, and a priority order of allocation of the storage tiers associated with the virtual volume, and
in accordance with a write request from the application for which the managed policy is set to the virtual volume, allocate the pool areas to the virtual volume from the storage tiers associated with the virtual volume according to the priority order of allocation of the storage tiers in the managed policy,
wherein the storage tiers set in the managed policy for the virtual volume are part of the plurality of different types of storage tiers.

2. The storage system according to claim 1,
wherein the controller is configured to allocate the required number of pool areas from the same tier to store data of each of one or more files associated with the application.

3. The storage system according to claim 1,
wherein the controller migrates the data written into the virtual volume between the storage tiers according to the policy as needed.

4. The storage apparatus according to claim 1,
wherein, in accordance with an external request, the controller migrates data between the corresponding storage tiers so as to store the data written into the virtual volume in the pool area assigned from the storage tier that was designated according to the request.

5. The storage system according to claim 1:
wherein the controller is configured to allocate the pool areas in page units of a specified size.

6. The storage system according to claim 1:
wherein the controller is configured to allocate the pool areas from one of the storage tiers which is selected from the storage tiers managed in the policy.

7. The storage system according to claim 1:
wherein the controller is configured to:
identify pool areas, from the pool areas allocated to the virtual volume, which are storing data of a file,
choose one of the storage tiers having enough free pool area for storing data stored in the specified pool areas and which is a highest priority storage tier from among the storage tiers associated with the virtual volume,
copy data from the identified pool areas to the pool areas in the chosen storage tier and change the allocation of the virtual volume.

8. A data management method in a storage system having a plurality of types of storage devices with different performances, the data management method comprising:
providing a plurality of pool areas from a plurality of storage areas provided by the plurality of types of storage devices as a plurality of different types of storage tiers;
providing a plurality of virtual volumes to a host computer;
managing respective policies of a plurality of applications associating an application of the host computer, one of the virtual volumes that the application reads data from and writes data to, storage tiers whose pool areas are to be allocated to the virtual volume, and a priority order of allocation of the storage tiers associated with the virtual volume; and
allocating, in accordance with a write request from the application for which the managed policy is set to the virtual volume, the pool areas from one of the storage tiers of the highest priority to the virtual volume from among the storage tiers associated with the virtual volume in accordance with the managed policy.

9. The data management method according to claim 8,
wherein the required number of pool areas are allocated from the same tier to store data of each of one or more files associated with the application.

10. The data management method according to claim 8, further comprising:
migrating the data written into the virtual volume between the storage tiers according to the policy as needed.

11. The data management method according to claim 8, further comprising:
migrating, in accordance with an external request, data between the corresponding storage tiers so as to store the data written into the virtual volume in the pool area assigned from the storage tier that was designated according to the request.

12. The data management method according to claim 8:
wherein the pool areas are allocated in page units of a specified size.

13. The data management method according to claim 8:
wherein the pool areas are allocated from one of the storage tiers with a highest priority among the storage tiers associated with the virtual volume in accordance with the managed policy.

14. The data management method according to claim 8, further comprising:
identifying pool areas, from the pool areas allocated to the virtual volume, which are storing data of a file;
choosing one of the storage tiers having enough free pool area for storing data stored in the specified pool areas and which is a highest priority storage tier from among the storage tiers associated with the virtual volume; and
copying data from the identified pool areas to the pool areas in the chosen storage tier and changing the allocation of the virtual volume.

* * * * *